United States Patent [19]
Takeuchi et al.

[11] Patent Number: 5,864,647
[45] Date of Patent: Jan. 26, 1999

[54] RECORDING AND REPRODUCING APPARATUS USING BASIC DATA

[75] Inventors: Akihiro Takeuchi, Ikoma; Yasuo Hamamoto, Higashiosaka; Kenji Morimoto, Osaka, all of Japan

[73] Assignee: Matsushita Electric Industrial Co., Ltd., Osaka-fu, Japan

[21] Appl. No.: 939,447

[22] Filed: Sep. 29, 1997

Related U.S. Application Data

[63] Continuation of Ser. No. 344,722, Nov. 23, 1994, abandoned.

[30] Foreign Application Priority Data

Nov. 25, 1993 [JP] Japan .................................. 5-295136

[51] Int. Cl.$^6$ ............................................. H04N 5/91
[52] U.S. Cl. .............................................. 386/68; 386/67
[58] Field of Search ................................... 386/67, 68, 5, 386/6, 7, 33, 27, 109, 111, 112; 360/32, 22, 21, 62; 348/784; H04N 5/91

[56] References Cited

U.S. PATENT DOCUMENTS

| | | |
|---|---|---|
| 5,136,391 | 8/1992 | Minami . |
| 5,138,501 | 8/1992 | Ii et al. . |
| 5,282,049 | 1/1994 | Hatakenaka et al. ................... 358/335 |
| 5,301,070 | 4/1994 | Tanaka ................... 360/10.1 |
| 5,377,051 | 12/1994 | Lane et al. ............................. 360/33.1 |
| 5,481,412 | 1/1996 | Bannai et al. ............................. 360/18 |

FOREIGN PATENT DOCUMENTS

| | | |
|---|---|---|
| 0 505 985 A2 | 9/1992 | European Pat. Off. . |
| 0505985 | 9/1992 | European Pat. Off. ......... H04N 5/92 |
| 0 553 949 A2 | 8/1993 | European Pat. Off. . |
| 0 596 527 A2 | 5/1994 | European Pat. Off. . |
| 2-94071 | 4/1990 | Japan . |
| WO 94/17631 | 8/1994 | WIPO . |

OTHER PUBLICATIONS

European Search Report dated Dec. 19, 1995.
"Interface Magazine", p. 124, (Aug. 1992).

*Primary Examiner*—Robert Chevalier
*Attorney, Agent, or Firm*—Ratner & Prestia

[57] ABSTRACT

Recording apparatus for recording video signal on a tape by helical scan heads has a special frame data detector for detecting a special frame data that can be processed during a reproducing operation, without any additional data, to reproduce an image, a memory for storing the special frame data, and inserting arrangement for inserting a selected track after a predetermined number of tracks. One selected track is written with a portion of the special frame data repeatedly, and another selected track is written with another portion of the special frame data repeatedly, and so on. During the high speed reproducing mode, various portions of the special frame data as obtained from a number of selected tracks are gathered to form an image.

10 Claims, 7 Drawing Sheets

RECORDING AND REPRODUCING APPARATUS USING BASIC DATA

This application is a continuation of application Ser. No. 08/344,722 filed Nov. 23, 1994 now abandoned.

BACKGROUND OF THE INVENTION

1. Field of the Invention

The present invention relates to a helical scan-type recording and/or reproducing apparatus for recording and/or reproducing large volumes of data such as digital video signals, and relates particularly to a video cassette recorder or other recording and/or reproducing apparatus capable during data reproduction of reproducing data at a reproducing speed different from that used during normal data reproduction.

2. Description of the Prior Art

The recording and reproducing method described in Japanese patent laid-open publication No. 2-094071 is one known method used for special reproducing modes in conventional digital recording video cassette recorders (VCRs). In this method, still image data extracted from the video signal for use during high speed reproduction is recorded to a specific tracing pattern across plural tracks. The tracing pattern of this method is compatible with only one non-standard special reproducing mode.

As a result, this type of VCR can only offer one special reproducing mode speed at which a stable still or slow-motion video image can be reproduced, and the availability of only one special reproducing mode speed is considered substandard (insufficient) in today's VCR market. Therefore, the problem with the method described above is that data must be recorded in duplicate to plural tracing patterns in order to provide plural special reproducing mode speeds. This makes recording and reproducing increasingly complex, and wastes recording space.

SUMMARY OF THE INVENTION

Therefore, the present invention divides the basic components of the video signal into plural parts, and records these parts repeatedly to specific intermittently selected tracks of the normal tape pattern. Data other than this basic video signal component data or all data is recorded to the remaining tape area that is not part of the specific intermittently selected tracks.

According to a preferred embodiment of the invention, a recording apparatus for recording video signal on a tape along a diagonally extending tracks by a helical scan head, in which the video signal has a basic data that can be processed during a reproducing operation without any additional data to reproduce an image, comprises: basic data detection means for detecting a basic data; memory means for storing said basic data in response to the detection of the basic data by said basic data detection means; and inserting means for inserting a selected track after a predetermined number of tracks, said selected track being written with a portion of said basic data repeatedly.

According to a yet preferred embodiment of the invention, a recording apparatus for recording video signal on a tape along a diagonally extending tracks by a helical scan head, in which the video signal has a basic data that can be processed during a reproducing operation without any additional data to reproduce an image, comprises: basic data detection means for detecting a basic data; memory means for storing said basic data in response to the detection of the basic data by said basic data detection means; buffer means for storing at least the video data other than said basic data; head means for writing and/or reading video data on a tape; switching means being turned to a first switched position for sending data from said buffer means to said head means, and being turned to a second switched position for sending data from said memory means to said head means; switch control means for controlling said switching means to turn alternately to said first and second switched positions with the first switched position being maintained for writing a predetermined number of tracks and the second switched position being maintained for writing a selected track; and memory control means for controlling said memory means to repeatedly produce a portion of said basic data during said switching means being turned to said second switched position.

According to a yet another preferred embodiment of the invention, a recording and reproducing apparatus for recording and reproducing video signal on and from a tape along a diagonally extending tracks by a helical scan head, in which the video signal has a basic data that can be processed during a reproducing operation without any additional data to reproduce an image, comprises:

(I) a recording arrangement comprising: basic data detection means (4) for detecting a basic data; memory means (5) for storing said basic data in response to the detection of the basic data by said basic data detection means; buffer means (6) for storing at least the video data other than said basic data; head means (12, 13) for writing and/or reading video data on a tape; switching means (SW2) being turned to a first switched position for sending data from said buffer means to said head means, and being turned to a second switched position for sending data from said memory means to said head means; switch control means (101) for controlling said switching means to turn alternately to said first and second switched positions with the first switched position being maintained for writing a predetermined number of tracks and the second switched position being maintained for writing a selected track; and memory control means (7) for controlling said memory means to repeatedly produce a portion of said basic data during said switching means being turned to said second switched position; and (II) a reproducing arrangement for reproducing data from the tape at a high reproducing speed, comprising: reading means (11, 12, 17, 18, 19, 21) for reading basic data from said selected tracks; and storing means (22) for storing said basic data.

In operation during reproduction, the tape is driven at a tape speed different from the normal tape speed, and the portions of the basic data as stored in the selected tracks are obtained by the rotating head, while other video signals stored in the remaining tracks are ignored. The data in the selected tracks are properly obtained by detecting the ID data added to each portion of the basic data.

By arranging the data as described above, the data needed to reproduce the video can be effectively obtained at reproduction speeds different from the normal speed, and good image quality can be obtained during special reproduction modes.

According to the present invention, good image quality can be obtained during special reproduction modes because the basic components of the video signal are divided into plural parts, and these parts are recorded to specific intermittently selected tracks of the normal tape pattern. High speed reproduction modes are extremely important functions for indexing and program searching in both consumer and commercial VCRs, but indexing and content searching are made more difficult if the image quality is poor. It is therefore possible to provide a VCR with high practical value by improving the image quality of the special reproducing modes.

In addition, if time code data or similar video frame indexing data is inserted to a selected track of the invention, the video frame data can be reliably obtained during searches. As a result, the invention also provides an extremely effective method for reliably indexing the tape to a specified frame number of other indexing information.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1A:
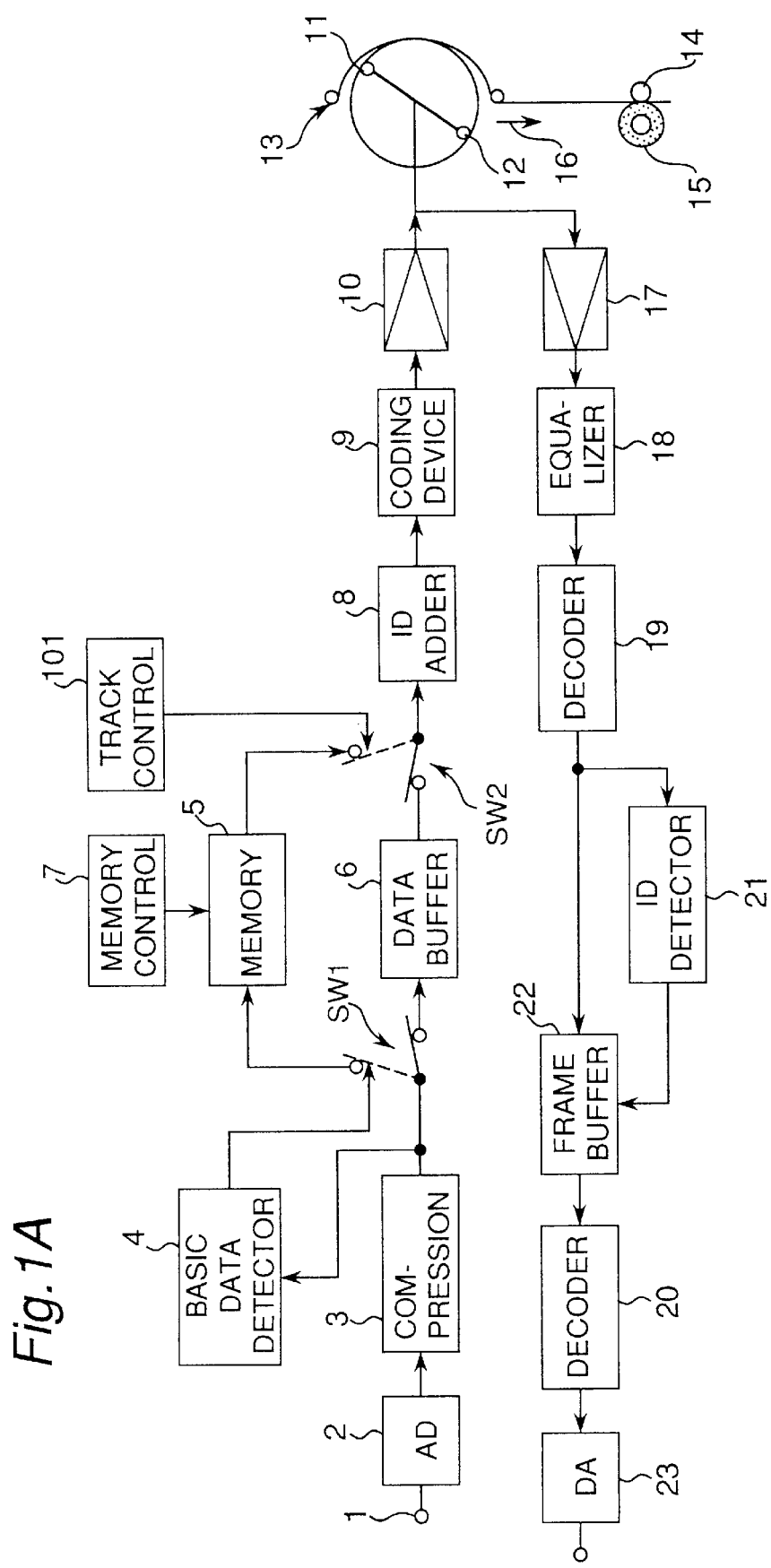
FIG. 1A is a block diagram of a preferred embodiment of the invention.

The first embodiment of a recording and reproducing apparatus according to the invention is described below with reference to the accompanying figures, of which FIG. 1A is a block diagram.

Referring to FIG. 1A, the video signal input from the input terminal 1 and digitized by the analog/digital (A/D) converter 2 is then compressed by a bandwidth compression circuit 3.

Note that while this bandwidth compression circuit 3 applies a discrete cosine transformation (DCT) operation, the nature of the applied compression is not essential to the present invention, and shall therefore not be limited to this or any other specific compression method. It is also possible to eliminate bandwidth compression and thus the bandwidth compression circuit 3.

The basic data of the video data bandwidth-compressed by the bandwidth compression circuit 3 is then detected by a basic data detector 4. It is noted that the basic data is one frame data or one field data that can be processed during the reproducing operation, without any additional data, to reproduce one frame or one field image. Thus, the basic data is also referred to as an independent viewable data. For example, the basic data may be one field luminance signal in the case where the bandwidth compression circuit 3 is not provided. If one field luminance signal is extracted and reproduced, one picture can be reproduced on a screen.

Another example of the basic data may be an I frame data of the DCT compressed data. All of one I frame data may be used as a basic data, or some portion of the I frame data may be used as a basic data. The portion of the I frame data may be a low frequency portion of the DCT data, such as a portion 46 shown in FIG. 7.

When Huffman coding is used for data compression in bandwidth compression circuit 3, the data can be efficiently allocated. When the video signal contains a color difference signal in addition to the luminance signal in a component signal format, the basic principle does not change and it is sufficient to extract the basic data needed to reproduce the image from the luminance signal and color difference signal information. It is also possible to use a time code, video frame number, or similar information as the basic data rather than the video information itself. This latter case makes it possible to search for a specific time code or frame number at high speed, and automatically index the heads.

In the case where the bandwidth compression circuit 3 is not provided, the basic data is detected directly from the video data of the input video signal by the basic data detector 4.

The output of the basic data detector 4 controls a switch SW1. Normally, the switch SW1 is switched to the position shown by a real line, so that the bandwidth compression circuit 3 is connected to a data buffer 6. When the basic data detector 4 detects the basic data, such as an I frame data, switch SW1 is switched to the position shown by a dotted line, so that the bandwidth compression circuit 3 is connected to memory 5. The switched position shown by dotted line continues until the end of the basic data, such as the end of the I frame data. Thereafter, the switch SW1 is returned back to the position shown by the real line. Thus, the basic data is stored in memory 5, and non-basic data is stored in data buffer 6. The reading and writing of the memory 5 is controlled by a memory control 7 which includes an address control. The outputs of memory 5 and data buffer 6 are connected to switch SW2 and further to an ID adder 8.

Figure 1B:
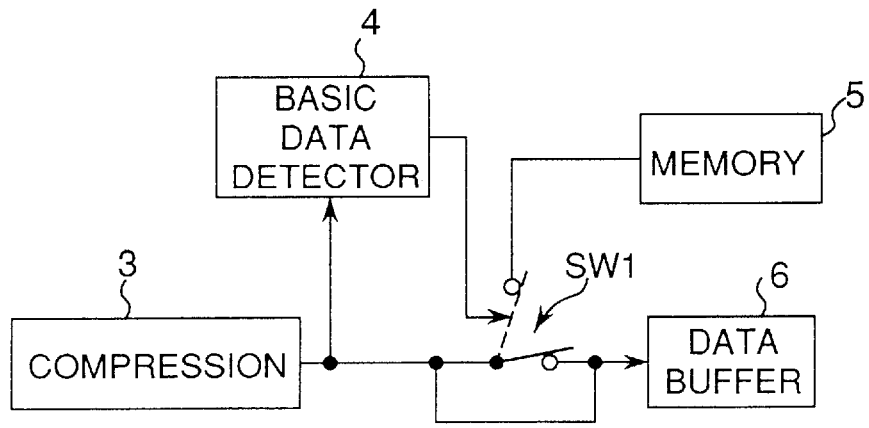
FIG. 1B is a diagram showing a modification of a switch.

It is noted that swtich SW1 can be arranged as shown in FIG. 1B in which the line between bandwidth compression circuit 3 and data buffer 6 is always connected, so that the data buffer 6 stores every video signal, i.e., not only the non-basic data, but also the basic data. It is also noted that instead of using switch SW1, a filter can be employed for obtaining the basic data in the case where the frequency of the basic data is different from that of the non-basic data.

Switch SW2 is controlled by a track control 101 as will be explained in detail later.

Figure 5:
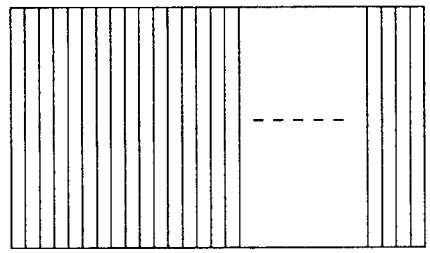
FIGS. 5, 6 and 7 are diagrams used to describe the sub-data of the basic data of the video signal.
Figure 6:
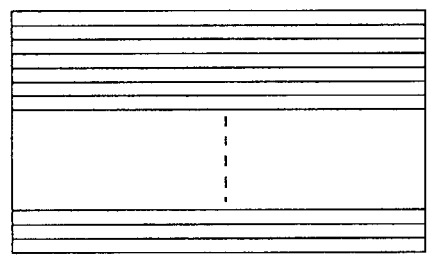

The memory 5 stores one frame data which is divided into a plurality of sub-data, e.g., forty sub-data respectively representing forty slices of an image, such as shown in FIG. 5 in which the image is divided into forty vertical slices, or FIG. 6 in which the image is divided into forty horizontal slices. Other methods of dividing the image can also be used with no affect on the basic concept of the invention.

Figure 7:
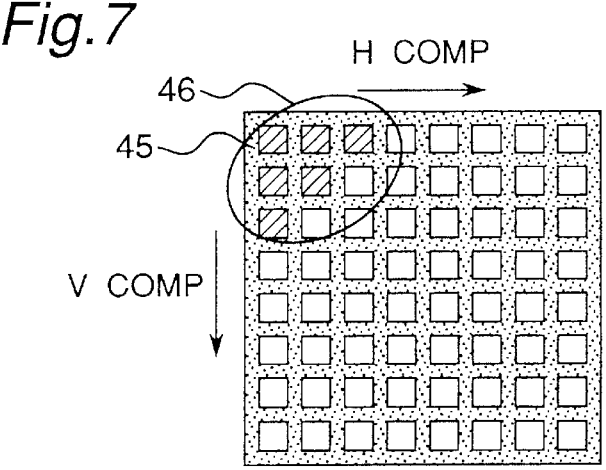

Furthermore, in the case where the video data is converted by means of a conventional 8×8 DCT operation, as shown in FIG. 7, the top left corner 45 shows the coefficient of the DC component, the coefficients for the horizontal high frequency components are shown sequentially to the left, and the coefficients for the vertical high frequency components are shown sequentially down. In image compression using DCT, these coefficients are normally weighted, and the transmitted image is weighted with more information near the top left corner, such as in the enclosed circle 46. It is known that the more the DCT coefficients are weighted near the top left corner, the more important the DCT coefficients are to image reproduction. As a result, it is also possible to extract the area 46 in the top left corner as the basic data. It is also possible to record only the high bits of this area 46 as the basic data.

Figure 2:
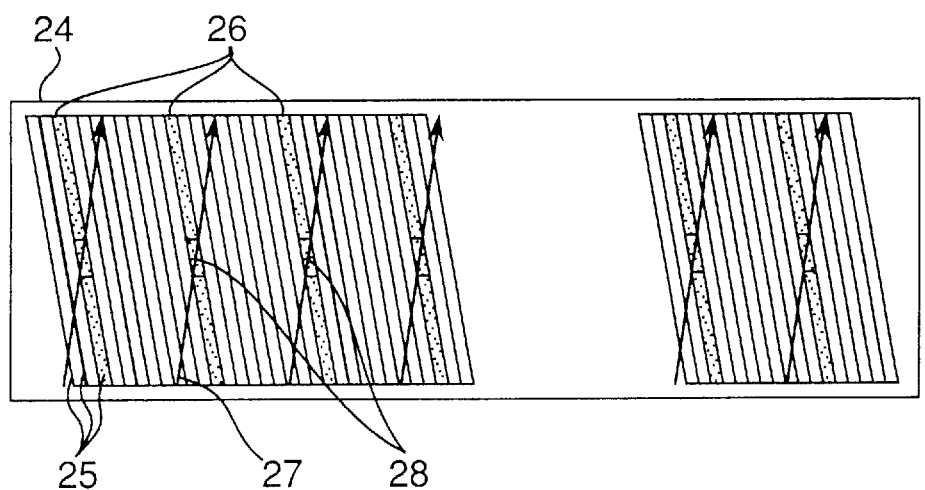
FIG. 2 is a diagram showing an example of the tape pattern of the preferred embodiment of the invention.

Track control 101 normally holds the switch SW2 in the position shown by a real line so that the video data are sequentially transferred from the data buffer 6 to the ID adder 8. After sending the video data for a predetermined number of tracks, such as eight tracks, the track control 101 turns the switch SW2 to the position shown by a dotted line, and maintains in the turned position for one track period, then the track control 101 returns the switch SW2 back to the normal position shown by the real line. This operation is repeated so that a track 26 (referred to as a selected track) carrying data from memory 5 is inserted in every other eight tracks 25 carrying normal video data, as shown in FIG. 2.

During the switch SW2 turned to the dotted line position, memory control 7 controls memory 5 to read and send one sub-data, repeatedly. Thus, in the selected track, the same sub-data is repeatedly recorded for a number of times depending on the length of the sub-data. When the next selected track comes, the sub-data which is the next sub-data of the previous sub-data is read and send for recording repeatedly on said next selected track.

According to the above example, since there are forty sub-data, forty selected tracks are used to completely record one frame data stored in memory 5.

ID Adder 8 adds various identification information, such as an ID for the selected track, position information of the sub-data, etc.

A transmission coding device 9 adds an error correction code and processes the video signal, and is then modulated. This modulation method may comply with NRZI, 8–14, or other common digital modulation method.

Figure 3:
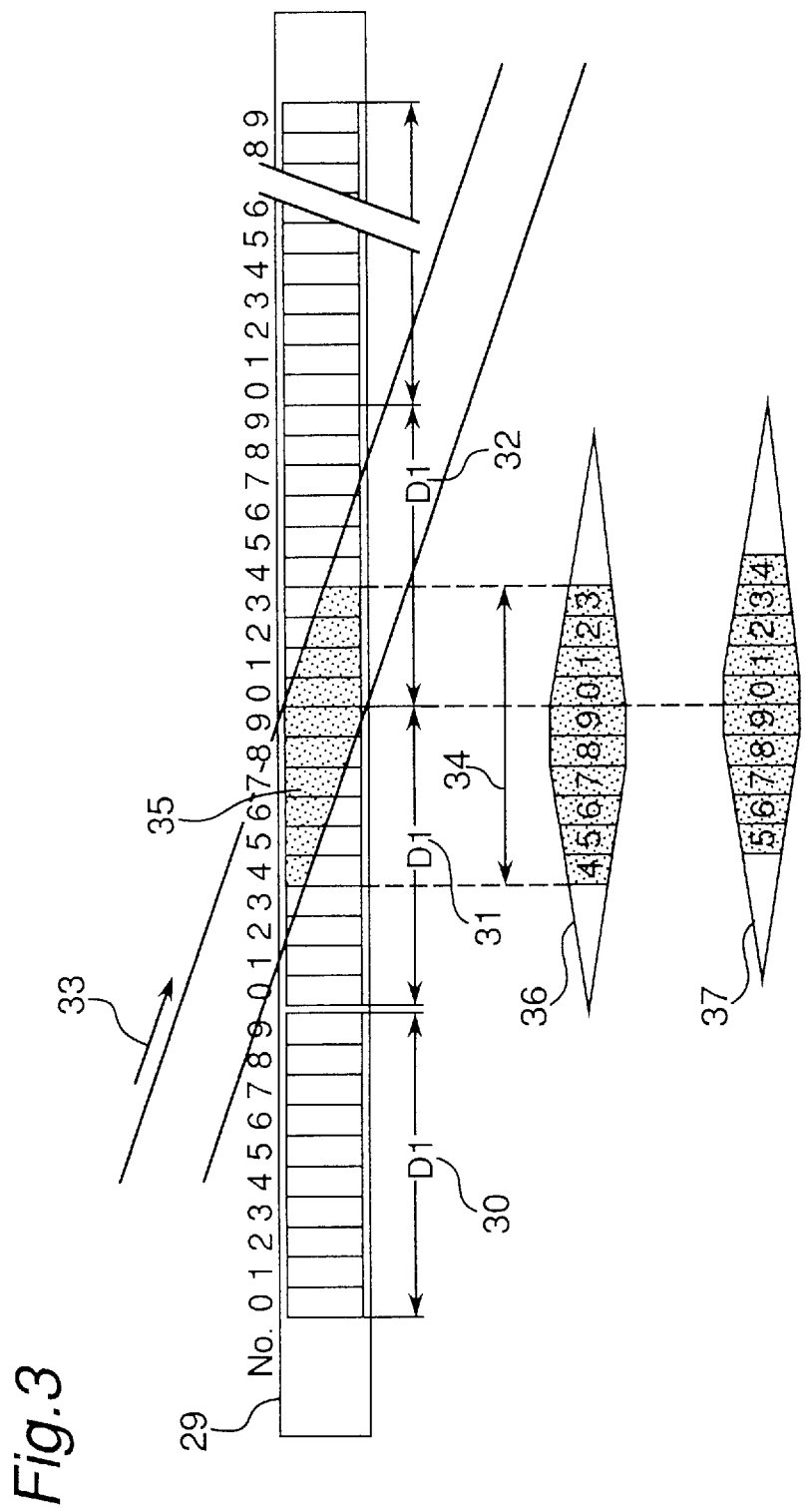
FIG. 3 is a diagram used to describe the tracing pattern of the recording/reproducing head of the preferred embodiment of the invention.

The data modulated by the transmission coding device 9 is then amplified by a recording amplifier 10 for recording to a tape 13 by means of head 11 (with azimuth angle R) and head 12 (with azimuth angle L). Note that the tape 13 is driven in the direction of arrow 16 by means of a capstan shaft 14 and a pinch roller 15. As shown in FIG. 3, head 11 or 12 records sub-data D1 repeatedly in the selected track 29. Sub-data D1 has ten sub-blocks.

Referring again to FIG. 1A, the recording and reproducing apparatus according to the invention further has reproducing section including a preamplifier 17, a reproduction equalizer 18, a transfer decoder 19, an ID detector 21, a frame buffer 22, a decoder 20 and a digital/analog (D/A) converter 23. The reproduced signal is amplifier by a preamplifier 17 and processed by reproduction equalizer 18. Then, the processed signal is demodulated and error corrected by the transfer decoder 19.

The decoded data from the transfer decoder 19 is stored in the frame buffer 22 to the address detected by the ID detector 21. Data is sequentially read from the frame buffer 22 at a constant rate. The reproduced data is then input to decoder 20 for decoding to reverse the compression applied during recording. Then, digital/analog conversion is effected by the digital/analog (D/A) converter 23.

During special reproduction modes, such as high speed reproduction mode, the capstan shaft 14 and pinch roller 15 transport the tape 13 at a speed different from the tape speed during normal reproduction.

During high speed reproduction, as shown in FIG. 2, the heads scan the tape following the path indicated by arrows 27, intersecting the selected tracks 26 at points 28. It is noted that since the same sub-data is repeatedly recorded for a number of times in the selected track, the sub-data can be picked up by the intersecting head no matter where in the selected track the head intersects. The intersection at the selected track 26 is shown in detail in FIG. 3.

Referring to FIG. 3, as described above, the same sub-data D1 is recorded repeatedly to the selected track 29. The sub-data D1 has a plurality of, such as ten, sub-blocks which are numbered from 0 to 9. During the high speed reproduction, the head scans the path indicated by arrow 33. Thus, the intersecting point 28 shown in FIG. 2 corresponds to the period indicated by arrow 34 in FIG. 3.

If the head scans over the sub-block more than one-half of its total area, it is assumed that the head can properly read the data in the sub-block. Thus, in the example shown in FIG. 3, the head can read data from sub-block Nos. 4, 5, 6, 7, 8, 9, 0, 1, 2, 3 as diagrammatically shown at 36. If the intersecting point 28 should be shifted, the head can read data from other sub-blocks, such as Nos. 5, 6, 7, 8, 9, 0, 1, 2, 3, 4, as diagrammatically shown at 37. In this case, the head cannot reproduce data part No. 4 from the second period 31, but can read part No. 4 in the new third period 32, and therefore still reproduces all of sub-data D1. In this manner, since the same sub-data D1 is repeatedly recorded on the selected track, the sub-data D1 recorded in the selected track can be read properly no matter where in the selected track the head intersects.

In other words, by repeatedly positioning sub-data D1 with a length less than the length of the data (arrow 34) that can be reproduced by the head during high speed reproduction, it is possible to reproduce all of the sub-data D1 no matter what part of the data period is traced by the head. Furthermore, if the same data is recorded throughout the length of the track, it is possible to reproduce all of the sub-data D1 no matter what path the head traces across the track.

The reproduced sub-data D1 is detected by ID detector 21 and is stored in frame buffer 22 at a location specified by the address data carried in the sub-data D1. In this manner, when the head intersects forty selected tracks, the frame buffer 22 will be filled with one frame data which will be used for displaying one frame image on the screen.

Therefore, during a high speed reproduction, selected images can be reproduced.

According the present invention, there are few limitations relating to head scanning control, and stable, reliable searching is made possible. Furthermore, because all of the data can be reliably read, the length of the sub-data D1 can be shortened to more reliably reproduce the data around the point where the head output becomes half the total content of each data part. Note also that while the head width is shown as equal to the track width in FIG. 3, the length of sub-data D1 can be increased when the head is wider than the track width as it is in consumer VCRs.

In addition, note that the size of sub-data D1 cannot be very great because it is recorded plural times to one track. When it is therefore not possible to insert all of the basic data of the video signal to the sub-data D1, the video signal can be data compressed to reduce the effective data size, and/or the basic video signal data can be divided into plural parts D1–Dn, which are recorded to plural selected tracks.

One image compression method that can be used is the MPEG compression method described in "Interface Magazine," August 1992, p. 124. In this example, intra-frame coding is applied once every plural frames.

Figure 4:
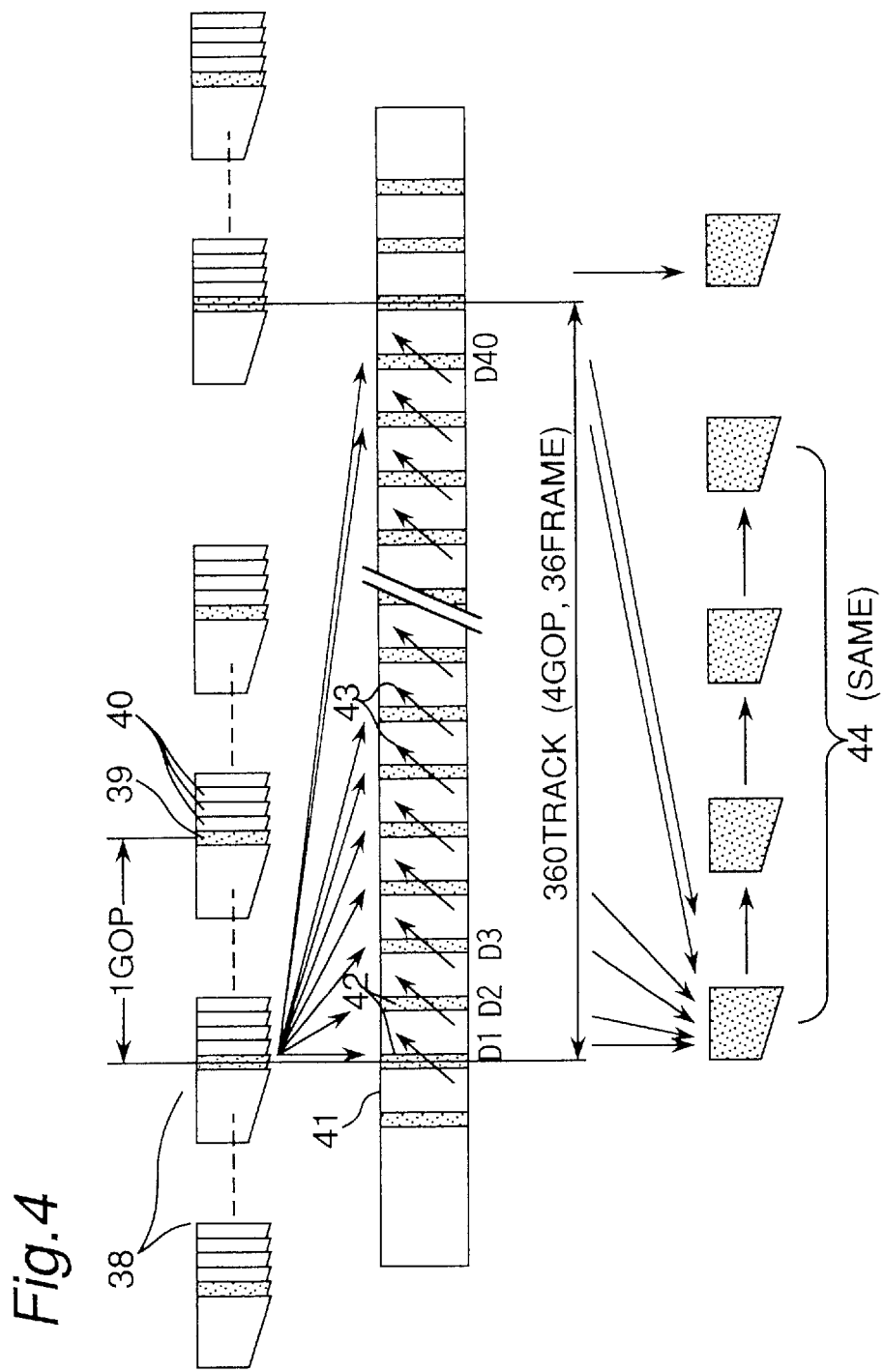
FIG. 4 is a diagram used to describe the relationship between the input signal and the tape track.

The method of recording an MPEG or similar video signal is described below with reference to FIG. 4. It is assumed that the video signal 38 in FIG. 4 is compressed, and is transferred by building one Group-of-Pictures (1 GOP) comprising the intra-frame compressed "intra-frame" 39 (also referred to as an I frame), and additional compressed frames 40 known as B or P frames. The video signal is recorded sequentially to tape 41 while forming the tracks. It is further assumed below that the video signal comprises nine frames in 1 GOP, and the VCR allocates 90 tracks for each 1 GOP.

If the basic data of the video signal is the I frame, the I frame is extracted once every four GOP (36 frames) because there is so much data in the I frame. The I frame is then divided into forty parts for recording as sub-data D1–D40. The forty sub-data are stored respectively in forty selected tracks 42 intermittently selected at a nine track interval. As a result, it is possible to record a large unit of basic data. During 9× reproduction (the reproduction speed is nine times the normal reproduction speed), the head scans path 43 intersecting the selected tracks as well as other tracks. The head properly reads the data only when the head intersects the selected track. When the head intersects forty selected tracks, all of the data D1–D40 for one frame are obtained, resulting in reproduction image 44. In this case, one full screen display can be obtained every four GOPs where one GOP comprises nine frames, i.e., once every 36 frames, and 9× reproduction is possible while consecutively displaying the same frame four times.

The rotating heads are commonly provided with opposing R and L azimuth angles as shown in FIG. 1A, and therefore alternately scan the tracks. In addition, because the tracks are intermittently selected on an odd-number count, the azimuth angles of the selected tracks also alternate R and L. It is therefore necessary to match the head azimuth with the track azimuth, and a simple phase control mechanism is therefore required in the capstan drive system. However, all of the data can be reproduced no matter what part of the track is scanned by the heads insofar as the azimuth angles match.

While the basic data in the above example is the data for the I frame, it is also possible to use the data of the I frame compressed using DPCM, DCT, or another method. In addition, it is also possible to record only the high bits, i.e., a predetermined number of bits from a most significant bit of a digitalized video signal, or record only the DC component of the DCT-converted frequency component as the basic data to the selected tracks. In this case, the image quality during high speed reproduction will be determined by only the DC component, i.e., ⅛ the normal bandwidth when DCT conversion is applied at 8×8 pixels.

This poses no problem, however, because the purpose of high speed searching is simply to locate that part of the video content to be viewed at normal speed.

In the embodiment shown in FIG. 1A the heads positioned on opposite sides of the rotating drum as shown in FIG. 2 have different azimuth angles R and L. Note that the same result can still be achieved using same-azimuth heads with a guard band provided between tracks.

Figure 8:
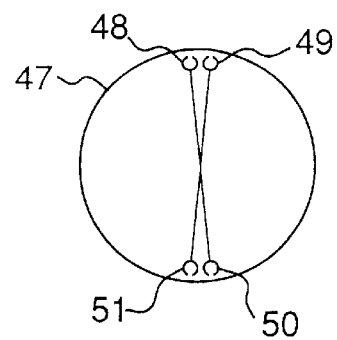
FIG. 8 is a diagram showing head arrangements for an alternative embodiment of the invention.

An alternative embodiment wherein two channels are recorded using the head configuration shown in FIG. 8 is described below. As shown in FIG. 8, the rotating drum 47 comprises heads 48 and 50 with azimuth angle R, and heads 49 and 51 with azimuth angle L. In this configuration, opposite-azimuth heads are provided in proximity on the rotating drum 47 with the height difference therebetween equal to the track pitch.

Figure 9:
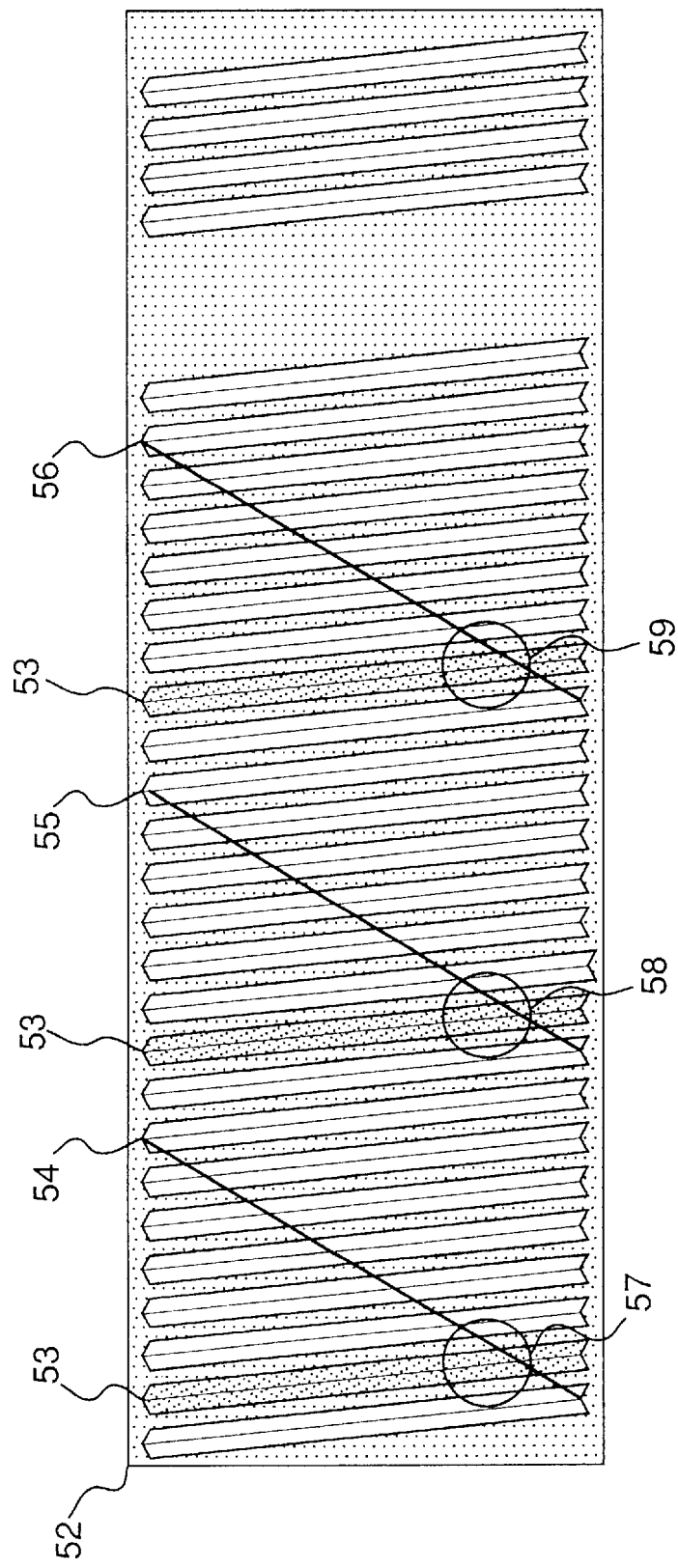
FIG. 9 is a diagram showing an example of the tape pattern of the alternative embodiment of the invention.

FIG. 9 shows the track pattern formed on tape 52 when the invention is applied using a rotating drum as shown in FIG. 8. As shown in FIG. 9, the basic data is allocated to a selected track pair 53 located every eighth pair of tracks on the tape 52. The same sub-data shown in FIG. 3 is recorded repeatedly to these tracks. Note that a space is shown between each pair of tracks for easier understanding, but it is not necessary to provide this space in practice.

The head path across the track pairs during 8× reproduction is shown by solid lines 54, 55 and 56. For simplification, the path of each head pair comprising R and L azimuth heads is indicated by a single solid line. That part of the selected track pair 53 crossed by the heads is indicated by circles 57, 58 and 59.

Because heads with R and L azimuth angles always move in pairs in this configuration, the data can be reliably reproduced every time the heads cross the selected tracks. Because it does not matter where the heads pass, the phase control required in the capstan drive system in the first embodiment above is not necessary, and the invention can therefore be achieved with a simplified configuration.

Furthermore, because phase control is particularly difficult at very high speed reproduction, e.g., 50× reproduction, the invention can be used to great effect at such high speeds. To achieve 50× reproduction, the selected tracks provided every eight track pairs in FIG. 9 are simply provided every fifty track pairs.

It is to be noted that the embodiments described above place the selected tracks every N track pairs for reproduction at N-times the normal reproduction speed. A method for reproducing the tape at a speed other than N-times the normal reproduction speed when the selected tracks are placed every N track pairs is described below with reference to FIGS. 10A, 10B, 10C and 10D.

Figure 10:
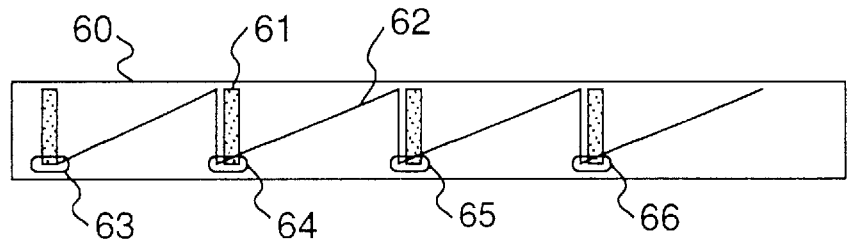
FIGS. 10A, 10B, 10C and 10D are diagrams showing path of the head.
Figure 10:
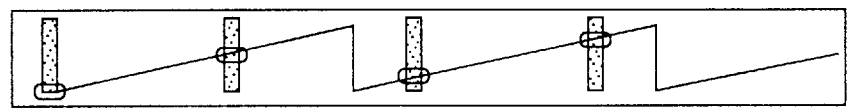
Figure 10:
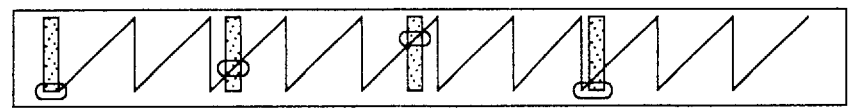
Figure 10:
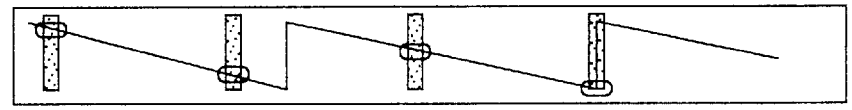

FIG. 10A shows the head path when the tape is driven at N-times the normal reproduction speed (N×). The selected tracks 61 are provided every N track pairs on tape 60, and the heads scan the tape along path 62 and intersect the selected tracks in the areas shown by circles 63, 64, 65 and 66. In the case shown in FIG. 10A, the heads intersect all selected tracks, and therefore reproduce all basic data.

In FIG. 10B, however, the tape speed exceeds N×; in FIG. 10C, the tape speed is slower than N×; and in FIG. 10D, the tape is driven in reverse. In each of these cases, however, the heads still intersect all selected tracks, and therefore reproduce all basic data.

Note that the length of the data repeat period in each track must be shorter than the data length (arrow 35 in FIG. 3) that can be used at the highest reproduction speed as described above with reference to FIG. 3. As a result, it is possible by means of the present invention to read all data at any tape speed at any phase, thereby making it possible to obtain good image quality at all search speeds, and to maintain good image quality even when the tape speed changes during search modes.

Note, also, that even when the track pattern is created by intermittent recording, e.g., driving the tape at half the speed shown in FIG. 9 during recording and using the heads on the drum shown in FIG. 8 once every two turns, the pattern shown in FIG. 9 will still be recorded to tape. As a result, it is still possible to obtain good image quality while searching at any tape speed as described with FIGS. 10A–10D above.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. Recording apparatus for recording a video signal on a tape along a diagonally extending tracks by a helical scan head, said video signal having a basic data that can be processed during a reproducing operation, without any additional data, to reproduce an image; said apparatus comprising:

basic data detection means for detecting a basic data;

memory means for selectively storing said basic data in response to the detection of the basic data by said basic data detection means;

buffer means for storing at least the video data other than said basic data;

head means for writing and/or reading video data on a tape;

switching means being turned to a first switched position for sending data from said buffer means to said head means, and being turned to a second switched position for sending data from said memory means to said head means responsive to an output from said basic data detection means;

switch control means for controlling said switching means to selectively alternate between said first and second switched positions with the first switched position being maintained for writing a predetermined number of tracks and the second switched position being maintained for writing a selected track; and memory control means for controlling said memory means to repeatedly produce a portion of said basic data during said switching means being turned to said second switched position, wherein the switch control means and the memory control means cooperate to repeatedly produce basic data such that the same basic data is recorded at least three times in a row in the selected track of the tape.

2. Recording apparatus as claimed in claim 1, wherein said head means comprises a first pair of heads having different azimuth angle and located side-by-side, and a second pair of heads having the same arrangement as said first pair of heads, but situated 180 degrees spaced from said first pair of heads for effecting a two channel recording.

3. Recording apparatus as claimed in claim 1, wherein said basic data is one frame video data.

4. Recording apparatus as claimed in claim 1, wherein said basic data is one frame video data that has been intra-frame compression processed.

5. Recording apparatus as claimed in claim 1, wherein said basic data is a discrete cosine transformation compressed data.

6. Recording apparatus as claimed in claim 1, wherein said basic data is a low frequency portion of a discrete cosine transformation compressed data.

7. Recording apparatus as claimed in claim 1, wherein said basic data is a predetermined number of bits from a most significant bit of a digitalized video signal.

8. Recording apparatus as claimed in claim 1, further comprising an identification data adder for adding identification data to said portion of said basic data.

9. Recording and reproducing apparatus for recording and reproducing a video signal on and from a tape along a diagonally extending tracks by a helical scan head, said video signal having a basic data that can be processed during a reproducing operation, without any additional data, to reproducer an image, said apparatus comprising:

(I) a recording arrangement comprising:

basic data detection means for detecting a basic data;

memory means for selectively storing said basic data in response to the detection of the basic data by said basic data detection means;

buffer means for storing at least the video data other than said basic data;

head means for writing and/or reading video data on a tape;

switching means for selectively switching between a first switched position for sending data from said buffer means to said head means, and being turned to a second switched position for sending data from said memory means to said head means responsive to an output from said basic data detection means;

switch control means for controlling said switching means to turn alternately to said first and second switched positions with the first switched position being maintained for writing a predetermined number of tracks and the second switched position being maintained for writing a selected track; and memory control means for controlling said memory means to repeatedly produce a portion of said basic data during said switching means being turned to said second switched position; and, wherein the switch control means and the memory control means cooperate to repeatedly produce basic data such that the same basic data is recorded at least three times in a row in the selected track of the tape;

(II) a reproducing arrangement for reproducing data from the tape at a high reproducing speed, comprising:

reading means for reading said basic data from said selected tracks; and storing means for storing said basic data.

10. Recording and reproducing apparatus as claimed in claim 2, wherein said recording arrangement further comprising an identification data adder for adding identification data to said portion of said basic data, and wherein said reproducing arrangement further comprising an identification data detector.

* * * * *